United States Patent
Takeuchi et al.

(10) Patent No.: US 10,290,870 B2
(45) Date of Patent: May 14, 2019

(54) LITHIUM SULFIDE-IRON-CARBON COMPLEX

(71) Applicant: National Institute of Advanced Industrial Science and Technology, Chiyoda-ku, Tokyo (JP)

(72) Inventors: Tomonari Takeuchi, Ikeda (JP); Atsushi Sakuda, Ikeda (JP); Hiroyuki Kageyama, Ikeda (JP); Hikari Sakaebe, Ikeda (JP); Kuniaki Tatsumi, Ikeda (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 380 days.

(21) Appl. No.: 15/021,041

(22) PCT Filed: Sep. 10, 2014

(86) PCT No.: PCT/JP2014/073871
§ 371 (c)(1),
(2) Date: Mar. 10, 2016

(87) PCT Pub. No.: WO2015/037598
PCT Pub. Date: Mar. 19, 2015

(65) Prior Publication Data
US 2016/0268606 A1    Sep. 15, 2016

(30) Foreign Application Priority Data
Sep. 13, 2013    (JP) .................................. 2013-190215

(51) Int. Cl.
*H01M 4/58*    (2010.01)
*H01M 4/38*    (2006.01)
(Continued)

(52) U.S. Cl.
CPC ........... *H01M 4/5815* (2013.01); *C01B 17/22* (2013.01); *C01G 49/009* (2013.01);
(Continued)

(58) Field of Classification Search
CPC ............ H01M 4/58; H01M 4/38; H01M 4/04; H01M 4/136; H01M 10/0525; H01M 10/0562
See application file for complete search history.

(56) References Cited

U.S. PATENT DOCUMENTS 3,907,589 A    9/1975    Gay et al.
4,006,034 A *  2/1977    Shimotake ............ H01M 4/044
                                                    29/623.1
(Continued)

FOREIGN PATENT DOCUMENTS

JP    2005-050556    2/2005
JP    2005-228586    8/2005
(Continued)

OTHER PUBLICATIONS

"Electrochemical Evolution of an Iron Sulfide and Sulfur Based Cathode for All-Solid-State Li-Ion Batteries", Yersak et al., Journal of the Electrochemical Society, 160 (8), A1009-A1015. Apr. 26, 2013.*

(Continued)

*Primary Examiner* — Kenneth J Douyette
(74) *Attorney, Agent, or Firm* — McCarter & English, LLP

(57) ABSTRACT

The main object is to provide a novel material with excellent charge and discharge characteristics, such as a high utilization rate of a positive electrode, a high capacity, and good cycle characteristic, in which the material is a compound containing as the major component lithium sulfide useful as a cathode active material for lithium secondary batteries.

(Continued)

The invention provides a lithium sulfide-iron-carbon composite containing lithium, iron, sulfur and carbon as constituent elements, with lithium sulfide ($Li_2S$), as the main phase, having a crystallite size of 50 nm or less as calculated from the half width of the diffraction peak based on the (111) plane of $Li_2S$ as determined by X-ray powder diffraction.

17 Claims, 8 Drawing Sheets

(51) Int. Cl.

| | | |
|---|---|---|
| *H01M 10/0525* | (2010.01) | |
| *H01M 10/0562* | (2010.01) | |
| *H01M 4/1397* | (2010.01) | |
| *H01M 4/36* | (2006.01) | |
| *H01M 4/04* | (2006.01) | |
| *H01M 4/136* | (2010.01) | |
| *H01M 10/058* | (2010.01) | |
| *H01M 10/44* | (2006.01) | |
| *C01B 17/22* | (2006.01) | |
| *C01G 49/00* | (2006.01) | |
| *H01M 4/02* | (2006.01) | |

(52) U.S. Cl.
CPC ....... *H01M 4/0433* (2013.01); *H01M 4/0445* (2013.01); *H01M 4/136* (2013.01); *H01M 4/1397* (2013.01); *H01M 4/364* (2013.01); *H01M 4/38* (2013.01); *H01M 4/58* (2013.01); *H01M 10/058* (2013.01); *H01M 10/0525* (2013.01); *H01M 10/0562* (2013.01); *H01M 10/446* (2013.01); *C01P 2002/72* (2013.01); *C01P 2004/61* (2013.01); *C01P 2006/40* (2013.01); *H01M 2004/027* (2013.01); *H01M 2004/028* (2013.01); *H01M 2220/20* (2013.01); *H01M 2220/30* (2013.01); *H01M 2300/0065* (2013.01); *H01M 2300/0068* (2013.01); *Y02T 10/7011* (2013.01)

(56) References Cited

U.S. PATENT DOCUMENTS

| | | |
|---|---|---|
| 2005/0181277 A1 | 8/2005 | Koga et al. |
| 2011/0223481 A1 | 9/2011 | Takeuchi |

FOREIGN PATENT DOCUMENTS

| | | |
|---|---|---|
| JP | 2009-283344 | 12/2009 |
| JP | 2011-096372 | 5/2011 |
| JP | 2013-026031 | 2/2013 |
| JP | 2013-75816 | 4/2013 |
| WO | 2010/084808 | 7/2010 |

OTHER PUBLICATIONS

Supplemental European Search Report based on co-pending European Application No. 14843674, dated Apr. 19, 2017—6 Pages.

Takeuchi, Tomonari, et al., "Preparation of Electrochemically Active Lithium Sulfide-Carbon Composites Using Spark-Plasma-Sintering Process" Journal of Power Sources, 2010, vol. 195, pp. 2928-2934.

Takeuchi, Tomonari, et al., "Preparation of Li2S—FeS2 Composite Electrode Materials and their Electrochemical Properties", Journal of the Japan Society of Powder and Powder Metallurgy, 2013, vol. 60, No. 1, pp. 13-18.

Takeuchi, Tomonari, et al., "Preparation of Li2S—FeSx—C Composite Positive Electrode Materials and their Electrochemical Properties", Oct. 19, 2013, Abstract Only, 1 Page.

Takeuchi, Tomonari, et al., "Preparation of Li2S—FeSx Composite Positive Electrode Materials and their Electrochemical Properties with Pre-Cycling Treatments", Journal of the Electrochemical Society, 2015, vol. 162, No. 9, pp. A1745-A1750.

Takeuchi, Tomonari, "Charge-Discharge Characteristics of Aluminum and Gallium Sulfides", The Electrochemical Society of Japan, Mar. 26, 2010, 2520. 1 Page.

Takeuchi, Tomonari, et al., "Application of Graphite Anode in All-Solid-State Lithium Secondary Battery with Li2S—C Composite Positive Electrode", Battery Symposium in Japan, The Committee of Battery Technology, The Electrochemical Society of Japan, Oct. 7, 2011, 3E14. Abstract Only, 1 Page.

International Search Report based on co-pending International Application No. PCT/JP2014/073871, dated Dec. 9, 2014.

\* cited by examiner

LITHIUM SULFIDE-IRON-CARBON COMPLEX

CROSS-REFERENCE TO RELATED APPLICATIONS

This application is a national stage application filed under 35 USC 371 of PCT/JP2014/073871, filed Sep. 10, 2014, which claims the benefit of Japanese Patent Application Nos. 2013-190215, filed Sep. 13, 2013, all of which are incorporated herein, in entirety, by reference.

TECHNICAL FIELD

The present invention relates to a lithium sulfide-iron-carbon composite, a method for producing the composite, and a use of the composite.

BACKGROUND ART

Recent years have seen technical advances such as in portable electronic devices and hybrid vehicles. Thus, there is growing demand for a higher capacity of secondary batteries (in particular, lithium-ion secondary batteries) for use in those devices and vehicles. In current lithium-ion secondary batteries, the development of high-capacity positive electrodes lags behind that of high-capacity negative electrodes. Even high-capacity Li(Ni,Mn,Co)$O_2$-based materials, which have been actively researched and developed, have a capacity of merely about 250 to 300 mAh/g.

Sulfur, which has a theoretical capacity of as high as about 1,670 mAh/g, is one of the promising high-capacity electrode materials. However, elemental sulfur does not contain lithium, and thus lithium or lithium-containing alloy is required for use in the negative electrode, leaving few options for the negative electrode.

Lithium sulfide, however, contains lithium, and thus graphite or silicon-containing alloy, for example, can be used in negative electrodes; therefore, lithium sulfide can provide a considerably wider selection for negative electrodes and prevent the risk of short circuit and the like caused by dendrites generated by metal lithium. However, as lithium polysulfide, lithium sulfide flows into the electrolyte during the charge or discharge in the battery system using an organic electrolyte, and migrates into the negative electrode to cause segregation (e.g., Non-patent Literature 1 listed below), making it difficult to demonstrate the inherent high capacity of lithium sulfide. Therefore, to improve the performance of batteries including lithium sulfide as a positive electrode, there is a need for measures such as designing positive electrode layers capable of retaining the flowing lithium polysulfide in the positive electrode, creating electrolytes capable of protecting the negative electrode, and providing alternative solid electrolytes not involving lithium polysulfide flow.

One method for suppressing the flow of lithium polysulfide is to form the bond between sulfur atoms and other elements so that sulfur atoms cannot be released during the Li extraction/insertion reaction. For example, Patent Literature 1, listed below, discloses a method comprising adding $FeS_2$ to $Li_2S$ to form a composite, and producing a compound of $Li_xFe_yS_z$ and the like. However, adding a large amount of other elements increases the formula weight of the electrode active material, and also reduces the relative Li content, thus resulting in a decrease in theoretical capacity. In Patent Literature 1, for example, an equimolar amount of $FeS_2$ is added to $Li_2S$ to form a composite in which the Fe content is 17%, and the Li content is 33%, with the theoretical capacity estimated from the Li content being about 320 mAh/g, which is, however, significantly lower than the theoretical capacity (about 1,170 mAh/g) of lithium sulfide. Therefore, the amounts of other elements added must be minimized in the production of high-capacity electrode materials.

Nonetheless, the decrease in the amount of other elements added increases free elemental sulfur, which results in an increase in the proportion of elemental sulfur not contributing to the charge and discharge reaction. When used as other elements to be added, transition metals not only further decrease the electrical conductivity but also decrease the utilization rate of the electrode material. For example, as disclosed in Non-patent Literature 2, listed below, although the decrease in the Fe content of $Li_2S$—$FeS_2$ composite from 161 to 3% increases the theoretical capacity from about 350 mAh/g to about 930 mAh/g, the capacity obtained by the actual charge and discharge decreases from about 250 mAh/g to about 3 mAh/g. To form Fe—S bonds and achieve conductivity, the addition of Fe in an amount of about 10% or less is considered to be sufficient. Thus, the probable reason for the decrease in actual measured capacity is that the added Fe atoms are incorporated into the lithium sulfide crystal lattice and fail to form Fe—S bonds. Specifically, lithium sulfide itself remains mostly unchanged in the process of forming a composite, and the incorporated Fe atoms are present as a byproduct of $Li_2FeS_2$ and the like, thereby not contributing to increasing the utilization rate of the composite.

CITATION LIST

Patent Literature

PTL 1: WO2010/084808

Non-Patent Literature

NPL 1: T. Takeuchi, H. Sakaebe, H. Kageyama, H. Senoh, T. Sakai, and K. Tatsumi, J. Power Sources, 195, 2928 (2010).

NPL 2: Tomonari Takeuchi, Hiroyuki Kageyama, Koji Nakanishi, Toshiaki Ota, Atsushi Sakuda, Hikari Sakaebe, Hiroshi Senoh, Tetsuo Sakai, Kuniaki Tatsumi, Hironori Kobayashi, Zenpachi Ogumi, Funtai Oyobl Funmatsuyakin, 60, 13 (2013)

SUMMARY OF INVENTION

Technical Problem

The present invention was completed in view of the status quo of the related art described above. The main object is to provide a novel material with excellent charge and discharge characteristics, such as a high utilization rate of a positive electrode, a high capacity, and good cycle characteristics, in which the material is a compound containing as the major component lithium sulfide useful as a cathode active material for lithium secondary batteries.

Solution to Problem

The present inventors conducted extensive research to achieve the object and found that a method can form a mixture of lithium sulfide and iron sulfide in which an atomic-level reaction has suitably proceeded by a heating reaction in electric current sintering, that subjecting the mixture together with carbon to mechanical milling forms a metastable phase in which iron atoms are incorporated inside the lithium sulfide crystal lattice, and that the metastable phase is stabilized when the mixture is microstructured. The method comprises filling an electrically conductive die with a mixture comprising a lithium-containing compound, an iron-containing compound, and a sulfur-containing compound; applying a pulsed direct current to the mixture in a non-oxidizing atmosphere while applying pressure to the mixture to subject the mixture to a heating reaction; and subjecting the obtained product together with a carbon-containing compound to mechanical milling. The inventors also found that the composite obtained by this method exhibits enhanced electrical conductivity even inside the crystal because of the presence of iron atoms inside the crystal lattice of lithium sulfide, that the composite car, serve as a high-capacity material because of the improved utilization rate of lithium sulfide, and that the bonds formed between sulfur and iron substantially decrease free sulfur atoms, thereby increasing the cycle characteristics. The inventors conducted further research on the basis of the findings and completed the present invention.

Specifically, the present invention provides the following lithium sulfide-iron-carbon composite, the method for producing the composite, and the use of the composite.

Item 1. A lithium sulfide-iron-carbon composite comprising, as constituent elements, lithium, iron, sulfur, and carbon, wherein lithium sulfide ($Li_2S$) is present as the main phase, and wherein the crystallite size calculated from a half width of a diffraction peak based on the (111) plane of $Li_2S$ as determined by X-ray powder diffraction is 50 nm or less.

Item 2. The lithium sulfide-iron-carbon composite according to Item 1, wherein the Li content is 40 to 60 atomic %, the Fe content is 2 to 10 atomic %, the S content is 20 to 40 atomic %, the C content is 10 to 20 atomic %, and the lithium sulfide phase is present in an amount of 90 mol % or more.

Item 3. A method for producing the lithium sulfide-iron-carbon composite according to Item 1, the method comprising filling an electrically conductive die with a mixture comprising a lithium-containing compound, an iron-containing compound, and a sulfur-containing compound, applying a pulsed direct current to the mixture in a non-oxidizing atmosphere while applying pressure to the mixture to thereby subject the mixture to a heating reaction and, subjecting the obtained product together with a carbon-containing compound to mechanical milling.

Item 4. A cathode active material for a lithium-ion secondary battery, the material comprising the lithium sulfide-iron-carbon composite according to Item 1 or 2.

Item 5. A lithium-ion secondary battery comprising the cathode active material according to Item 4.

Item 5. An all-solid-state lithium-ion secondary battery comprising the cathode active material according to Item 4 and a lithium-ion conductive solid electrolyte.

Item 7. A pretreatment method for a lithium-ion secondary battery, the method comprising forming a lithium-ion secondary battery comprising the lithium sulfide-iron-carbon composite according to Item 1 or 2 as a cathode active material, charging and discharging the battery at a capacity lower than the theoretical capacity of the cathode active material, and repeatedly charging and discharging the battery with a stepwise increase in capacity.

Item 8. The pretreatment method for a lithium-ion secondary battery according to Item 7, wherein the initial charge and discharge is performed at $1/10$ to $1/15$ of the theoretical capacity of the cathode active material, and wherein the charge and discharge is performed with a stepwise increase in capacity by 30 to 100 mAh/g.

Item 9. The pretreatment method for a lithium-ion secondary battery according to Item 7 or 8, wherein the charge and discharge are performed at a potential range from the lower limit voltage of 1.0 to 1.3 V to the upper limit voltage of 2.8 to 3.0 V.

Advantageous Effects of Invention

The lithium sulfide-iron-carbon composite according to the present invention refers to a composite having a stabilized metastable phase of fine particles with a crystallite size of 50 nm or less, in which iron atoms are incorporated inside the lithium sulfide crystal lattice, and carbon is uniformly dispersed. In the lithium sulfide-iron-carbon composite, iron atoms incorporated into the lithium sulfide crystal lattice bond to sulfur atoms to thereby enhance the electrical conductivity even inside the lattice. Therefore, the lithium sulfide-iron-carbon composite achieves a high utilization rate and sufficiently exhibits nigh-capacity characteristics inherent to lithium sulfide. In addition, the bonds between sulfur and iron in the composite suppress the flow of polysulfide occurring during the Li extraction/insertion reaction, leading to excellent cycle characteristics. Moreover, the presence of carbon enhances the electrical conductivity. Thus, the composite can serve as a high-capacity cathode active material.

As described above, the lithium sulfide-iron-carbon composite according to the present invention is a highly useful substance as a cathode active material for lithium secondary batteries, such as non-aqueous electrolyte lithium-ion secondary batteries and all-solid-state lithium-ion secondary batteries.

The production method according to the present invention can produce a composite, which has such excellent properties, in a relatively simple manner.

DESCRIPTION OF EMBODIMENTS

Figure 1:
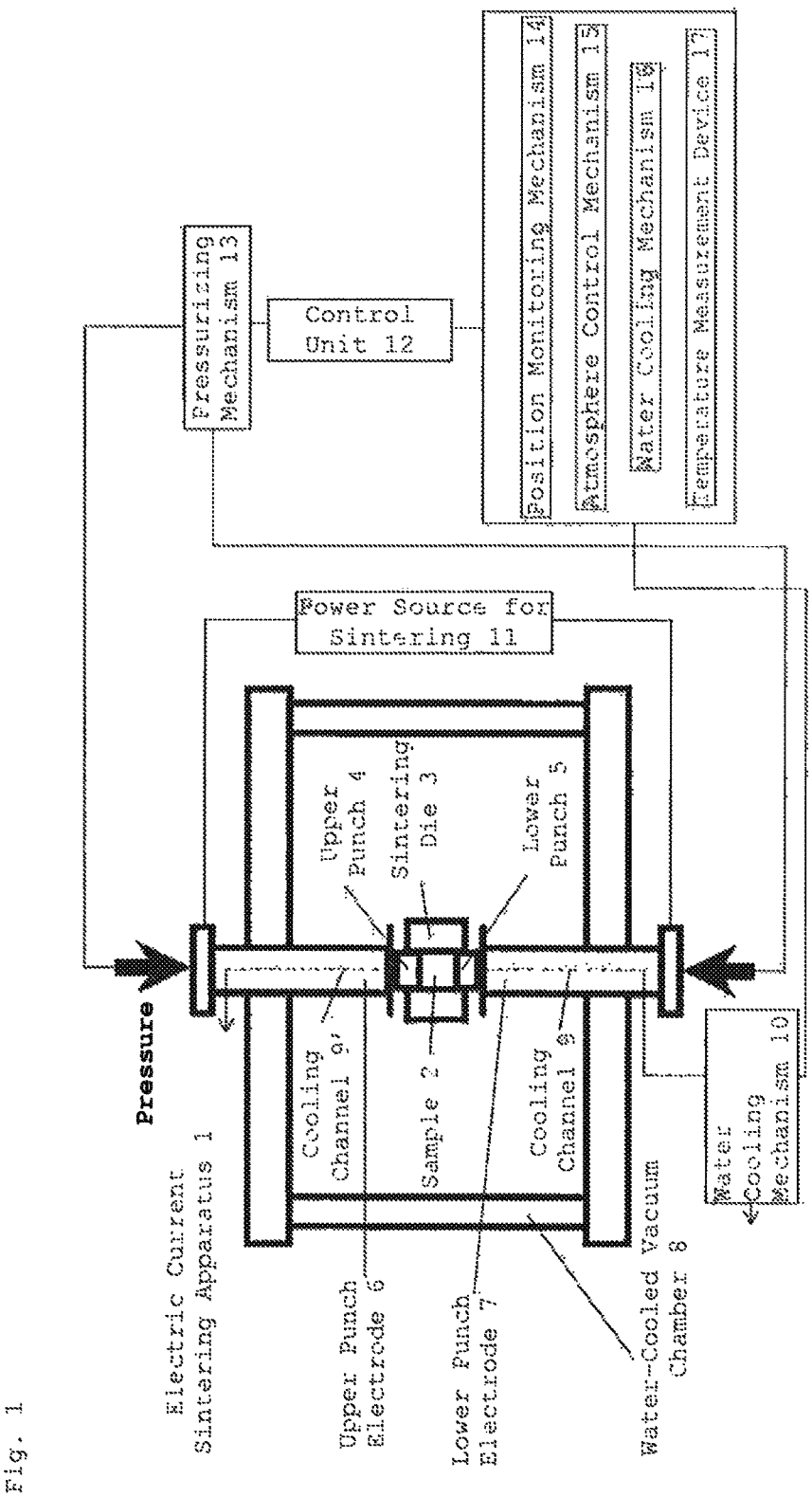
FIG. 1 is a schematic view showing an example of an electric cur rent sintering apparatus.

The following describes a method for producing the lithium sulfide-iron-carbon composite according to the present invention.

Method for Producing Lithium Sulfide-Iron-Carbon Composite

The lithium sulfide-iron-carbon composite according to the present invention is obtained by filling an electrically conductive die with a mixture comprising a lithium-containing compound, an iron-containing compound, and a sulfur-containing compound; applying a pulsed direct current to the mixture in a non-oxidizing atmosphere while applying pressure to the mixture to subject the mixture to a heating reaction; and subjecting the obtained product together with a carbon-containing compound to mechanical milling. This method can provide a mixture of lithium sulfide and iron sulfide in which an atomic level reaction has suitably proceeded by the heating reaction. Subjecting the mixture together with carbon to mechanical milling transforms the particles into microscopic particles so that iron atoms are incorporated into the lithium sulfide phase, thereby giving a composite in which the metastable phase is stabilized, while carbon is uniformly dispersed. The following describes the method in more detail.

(I) Starting Material Powder

The present invention uses a lithium-containing compound, an iron-containing compound, a sulfur-containing compound, and a carbon-containing compound as starting materials.

The type of each compound, i.e., the lithium-containing compound, iron-containing compound, sulfur-containing compound, and carbon-containing compound, is not particularly limited. Four or more compounds individually containing one each of lithium, iron, sulfur, and carbon may be mixed for use, or a compound containing two or more of elements of lithium, iron, sulfur, and carbon may be used as part of the starting materials.

These starting material compounds preferably contain no metal element other than lithium and iron. Elements other than, lithium, iron, sulfur, and carbon contained in the starting material compounds are preferably released and volatilized by the heating treatment described below in a non-oxidizing atmosphere. Specific examples of such lithium-containing compounds include lithium sulfide ($Li_2S$), lithium carbonate ($Li_2CO_3$), and lithium hydroxide (LiOH). Specific examples of such iron-containing compounds include metal iron (Fe), iron sulfide (FeS, $FeS_2$), and iron sulfate ($FeSO_4$). Specific examples of such sulfur-containing compounds include sulfur (S), lithium sulfide ($Li_2S$), benzothiophene ($C_8H_6S$), and iron sulfide (FeS, $FeS_2$). Specific examples of such carbon-containing compounds include carbon (C), lithium carbonate ($Li_2CO_3$), and benzothiophene ($C_8H_6S$). Of these, the most preferable is the combination of iron sulfide (FeS, $FeS_2$), lithium sulfide ($Li_2S$), and carbon (C) because the combination consists only of the constituent elements of the target product lithium sulfide-iron-carbon composite and causes a reaction with the minimum number of starting materials. Examples of carbon usable as the starting materials within the range described above include graphite, mesoporous carbon, and hard carbon (non-graphitizable carbon material).

The shape of these starting material compounds is not particularly limited, but is preferably in the form of powder having a mean particle size of about 0.1 to 100 μm. The mean particle size of starting material compounds 13 the value at which the cumulative frequency distribution reaches 50% in particle size distribution measured with a dry laser diffraction/scattering method.

The proportion of the starting materials, a lithium-containing compound, an iron-containing compound, a sulfur-containing compound, and a carbon-containing compound in the mixture is not particularly limited. However, in the finally obtained product, i.e., lithium sulfide-iron-carbon composite, it preferable that Fe is present in such an amount as to form Fe—S bonds without generating free sulfur atoms, that Li is present in such an amount as to have a theoretical capacity of about 600 m Ah/g or more estimated from the Li amount, and that Fe and C are present in such an amount as to achieve electrical conductivity. From these standpoints, it is preferable in the formed composite that the Li content is 40 to 60 atomic % (particularly 40 to 55 atomic %), that the Fe content is 2 to 10 atomic % (particularly 3 to 9 atomic %), that the S content is 20 to 40 atomic % (particularly 25 to 35 atomic %), and that the C content is 10 to 20 atomic % (particularly 13 to 17 atomic %). The proportion of the starting material compounds may be determined such that the proportion of the elements contained in the starting material compounds is equivalent to the proportion of the elements contained in the target composite.

The reason why Li is in such an amount as to have a theoretical capacity of about 600 m Ah/g or more is that Li(Ni,Mn,Co)$O_2$, an oxide-based high-capacity material, has a maximum energy density of 300 mAh/g×4 V=1200 Wh/kq, and so the composite, as an equivalent sulfur-based material (voltage 2 V), is considered sufficient if the theoretical capacity is 600 mAh/g or more.

(II) Method for Producing Composite (i) Electric Current Sintering Step

First, in the present invention, an electric current sintering step is performed in which an electrically conductive die is filled with a mixture containing a lithium-containing compound, an iron-containing compound, and a sulfur-containing compound, and the compounds are subjected to a heating reaction using a pulsed direct current method, also called "spark-plasma-sintering," "pulsed electric current sintering," or "plasma activated sintering," while pressure is applied to the mixture in a non-oxidizing atmosphere. The carbon-containing compound used as a starting material may be added at this stage, or may be added at the stage of the mechanical milling, described below. This method allows each element to disperse and migrate because of the heating treatment in the electric current sintering step to thereby prepare an intermediate in which the elements are mixed together at the atomic level.

A specific method may comprise filling an electrically conductive container with a starting material mixture of a lithium-containing compound, an iron-containing compound, and a sulfur-containing compound, and applying pulsed ON-OFF direct-current electricity to the mixture while applying pressure to the mixture in a non-oxidizing atmosphere.

The material for the electrically conductive container is not particularly limited as long as the material has electrical conductivity. Carbon, iron, iron oxide, aluminum, and tungsten carbide, as well as materials formed of a mixture of carbon and/or iron oxide with silicon nitride, can be suitably used.

The electric current sintering step is performed in a non-oxidizing atmosphere, for example, in an inert gas atmosphere of Ar, $N_2$ or the like, or in a reducing atmosphere of H or the like. The atmosphere may also be under decreased pressure where the oxygen concentration is sufficiently low, for example, the atmosphere in which the oxygen partial pressure is about 20 Pa or less.

When a container that can ensure sufficient hermetic sealing is used as an electrically conductive container, the inside of the container may be filled with a non-oxidizing atmosphere. The electrically conductive container may also not be completely hermetically sealed. When a semi-hermetically sealed container is used, the container may be placed inside a reaction chamber, and the inside of the reaction chamber may be filled with a non-oxidizing atmosphere, such as an inert gas atmosphere or a reducing atmosphere. This enables the heating reaction of the starting material mixture described above to proceed in a non-oxidizing atmosphere. In this case, it is preferable, for example, to fill the inside of the reaction chamber with an inert gas atmosphere, a reducing gas atmosphere, or the like of about 0.1 MPa or more.

Applying a pulsed direct current to the starting material mixture packed in the electrically conductive container heats the container with Joule heat, and heats the starting material mixture to allow the starting materials to react each other, thereby forming an intermediate in which the atoms are mixed together. Because this method enables the production of the target intermediate in a short time of 30 minutes or less, volatile Li or S is not much lost in the intermediate; thus, the intermediate maintains the proportion of the starting materials approximate to the proportion of the starting materials in the mixture.

The heating temperature for the electric current sintering step may be typically within the range of 400 to 1,200° C. Setting the temperature within the range facilitates the interdiffusion of the constituent elements, further mixes together the elements at the atomic level, and decreases sulfur atoms (free sulfur) not binding to transition metals, while suppressing the volatilization of elements, such as Li and S, thereby giving a high-capacity material. The time period during which the heating temperature is maintained is preferably about 30 minutes or less; when the temperature reaches the temperature range described above, the application of electric current may be immediately ended to allow the heated mixture to cool down. Setting the retaining time period within the range suppresses the volatilization of elements, such as Li and S, thereby giving a high-capacity material.

The pressure applied to the starting material powders may be, for example, about 5 to 60 MPa, and preferably about 10 to 50 MPa. Setting the pressure within the range strengthens the contact between the starting material powders, and achieves sufficient atomic interdiffusion when the material powders are heated, thus ensuring a sufficient reaction between the atoms in the starting material powders.

The apparatus for performing electric current sintering is not particularly limited as long as the apparatus can heat, cool, and pressure the starting material mixture, and can also apply electric current required for discharge. For example, a commercially available electric current sintering apparatus (spark plasma sintering apparatus) may be used. Such an electric current sintering apparatus and its mechanism are disclosed, for example, in JPH10-251070A.

The following describes a specific example of the electric current sintering step of the present invention with reference to FIG. 1, which shows a diagram of an electric current sintering apparatus.

The electric current sintering apparatus 1 comprises die (electron-conductive container) 3 in which sample 2 is filled, and comprises punches 4 and 5 for passing an electric current, which are a pair of up and down punches. The punches 4 and 5 for passing an electric current are supported by punch electrodes 6 and 7, respectively, and can apply a pulsed current through these punch electrodes 6 and 7 to sample 2 packed in die 3, while optionally applying pressure. The material for die 3 is not limited, and examples of the material include carbon materials, such as graphite.

In the apparatus shown in FIG. 1, the current-carrying part containing electron-conductive container 3, punches 4 and 5 for passing an electric current, and punch electrodes 6 and 7, all described above, is accommodated inside water-cooled vacuum chamber 8. The inside of the chamber can be adjusted to a predetermined atmosphere by atmosphere control mechanism 15. Thus, the inside of the chamber may be adjusted to a non-oxidizing atmosphere by using atmosphere control mechanism 15.

The control unit 12 drives and controls pressurizing mechanism 13, pulsed power supply 11, atmosphere control mechanism 15, water cooling mechanisms 10 and 16, and temperature measurement device 17. The control unit 12 is configured to drive the pressurizing mechanism 13 to thereby cause the punch electrodes 6 and 7 to apply a predetermined pressure to the starting material mixture.

The pulsed current to be applied for heating may be, for example, pulsed ON-OFF direct-current electricity having a pulse width of about 2 to 3 milliseconds and a cycle of about 3 Hz to 300 Hz. The specific current value varies depending on the type, size, and other factors of the electrically conductive container. However, the specific current value may be determined such that the temperature range described above is achieved. For example, when a graphite die having an inner diameter of 15 am is used, about 200 to 1,000 A is suitable. When a graphite die having an inner diameter of 100 mm is used, about 1,000 to 9,000 A is suitable. When performing the treatment, the current value may be controlled to achieve a predetermined temperature by increasing or decreasing the current value while monitoring the die temperature.

To obtain a pressurized starting material mixture, pressure may be applied, for example, through punch electrodes 6 and 7 to the starting material mixture packed in electrically conductive container 3, described above.

(2) Mechanical Milling Step

The product obtained in the electric current sintering step, described above, is subjected to mechanical milling together with a carbon-containing compound, mixed, pulverized, and reacted, thereby obtaining the target lithium sulfide-iron-carbon composite of the present invention. When the starting materials used in the electric current sintering step do not contain a predetermined amount of a carbon-containing compound, a carbon-containing compound may be added before the mechanical milling step.

Mechanical milling is a method for milling and mixing starting materials while adding mechanical energy to cause a reaction. This method adds mechanical shock or friction to starting materials to thereby mill and mix the materials and allows each compound contained in the starting materials to intensively come into contact one another, thus giving particles in nanoscopic size; thus, this method easily forms a metastable phase. In the present invention, the mechanical milling step forms metastable iron-containing lithium sulfide, which is difficult to produce only by a heating treatment in the electric current sintering step, and also stabilizes the lithium sulfide by forming it into nanoscopic-size particles. Moreover, the carbon added from the carbon-containing compound can provide excellent electrical conductivity.

Examples of mechanical milling apparatus for use include ball mills, vibrational mills, turbo mills, and disc mills. Of these, vibrational mills are preferable.

The mechanical milling is performed in a non-oxidizing atmosphere. The non-oxidizing atmosphere may be, for example, an inert gas atmosphere, such as Ar or $N_2$, or a reducing atmosphere, such as $H_2$.

The temperature for performing the mechanical milling is preferably about 200° C. or less to suppress the volatilization of sulfur and to facilitate the formation of the target composite having a high sulfur content.

The time period for performing the mechanical milling is not particularly limited. However, as described later, the mechanical milling may be performed until the obtained composite achieves a crystallite size of 50 nm or less.

Lithium Sulfide-Iron-Carbon Composite

The lithium sulfide-iron-carbon composite obtained by the method described above contains lithium sulfide as the main phase in powder X-ray diffraction measurement. The amount of lithium sulfide phase present is not particularly limited. However, the amount is preferably about 90 mol % or more based on the entire composite.

The composite is nanosized by mechanical milling, thus having a crystallite size of 50 nm or less. The crystallite size is a value calculated by using the Scherrer formula from the half width of the diffraction peak based on the (111) plane, which shows the peaks of the highest intensity of lithium sulfide observed as the main phase in powder X-ray diffraction measurement.

In such a composite, iron atoms are arranged inside the lithium sulfide crystal lattice, forming Fe—S bonds, and iron-containing lithium sulfide is present as a metastable phase. The metastable phase is milled into submicron particles by mechanical milling, and the iron-containing lithium sulfide, originally a metastable phase, is stabilized.

The lithium sulfide-iron-carbon composite having the characteristics described above according to the present invention contains few free sulfur atoms because iron atoms, i.e., additive element, are arranged inside the lithium sulfide crystal lattice to thereby form Fe—S bonds. Thus, the lithium sulfide, as lithium polysulfide, does not flow into the electrolyte during the extraction or insertion of Li, and does not migrate into or precipitate in the negative electrode, thereby showing excellent cycle characteristics. In addition, the Fe and C contents impart excellent electrical conductivity to the composite; in particular, the Fe—S bonds formed by Fe inside the lithium sulfide crystal lattice enhance the utilization of the inner part of the lithium sulfide crystal, rendering the composite a high-capacity material.

The lithium sulfide-iron-carbon composite obtained by the method described above may contain impurities in a trace amount of up to about 10 mol % other than the lithium sulfide crystal phase, and such a small amount of impurities has limited influence on the charge and discharge characteristics.

The lithium sulfide-iron-carbon composite according to the present invention can be effectively used as a cathode active material for lithium batteries, such as lithium primary batteries, lithium-ion secondary batteries, and metal lithium secondary batteries, taking advantage of the excellent characteristics mentioned above. In particular, because of the lithium content in the structure, the lithium sulfide-iron-carbon composite according to the present invention is considered to be a material that allows for charge and discharge from charging. In addition, because of the excellent cycle characteristics, the lithium sulfide-iron-carbon composite is useful as a cathode active material for lithium-ion secondary batteries. A lithium-ion secondary battery including the lithium sulfide-iron-carbon composite according to the present invention as a cathode active material may be a non-aqueous electrolyte lithium-ion secondary battery containing a non-aqueous solvent-based electrolyte as an electrolyte, or may be an all-solid-state lithium-ion secondary battery containing a lithium ion conductive solid electrolyte.

The non-aqueous electrolyte lithium-Jon secondary battery and all-solid-state lithium-ion secondary battery may have the same structure as that of a known lithium secondary battery except for the use of the lithium sulfide-iron-carbon composite according to the present invention as a cathode active material.

For example, the non-aqueous electrolyte lithium-ion secondary battery may have the same basic structure as that of a known non-aqueous electrolyte lithium-ion secondary battery except for the use of the lithium sulfide-iron-carbon composite, described above, as a cathode active material.

In a positive electrode, the lithium sulfide-iron-carbon composite described above may be used as a cathode active material, and a positive electrode prepared by mixing a conductive agent with a binder may be carried by a positive electrode collector, such as Al, Ni, stainless, or carbon. Examples of conductive agents for use include carbon materials, such as graphite, cokes, carbon black, and acicular carbon.

As a negative electrode, either lithium-containing materials or lithium-free materials can be used. Examples include tin, silicon, alloys containing these metals, and SiO, as well as graphite, sintering-resistant carbon, and metal lithium. These anode active materials may also optionally be carried by a negative electrode collector, such as Al, Cu, Ni, stainless, or carbon by using a conductive agent, a binder, and the like.

As a separator, for example, the following materials may be used: materials in the form of porous film, non-woven fabric, woven fabric, or the like made of polyolefin resin, such as polyethylene and polypropylene, fluororesin, nylon, aromatic aramid, inorganic glass, or the like.

As a solvent for non-aqueous electrolytes, the following solvents can be used: solvents, such as carbonates, ethers, nitriles, and sulfur-containing compounds, known as a solvent for non-aqueous solvent-based secondary batteries.

The all-solid-state lithium-ion secondary battery may also have the same structure as that of a known all-solid-state lithium-ion secondary battery except for the use of the lithium sulfide-iron-carbon composite according to the present invention as a cathode active material.

In this case, for example, the following electrolytes can be used: polymer-based solid electrolytes such as polyethylene oxide-based high-molecular compounds and high-molecular compounds containing at least one of a polyorganosiloxane chain and a polyoxyalkylene chain; sulfide-based solid electrolytes; and oxide-based solid electrolytes.

For the positive electrode of all-solid-state lithium-ion secondary batteries, for example, the lithium sulfide-iron-carbon composite according to the present invention is used as a cathode active material, and a positive electrode containing a conductive agent, a binder, and a solid electrolyte may be carried by a positive electrode collector, such as Ti, Al, Ni, and stainless. For the conductive agent, as with the non-aqueous solvent-based secondary batteries, for example, carbon materials, such as graphite, cokes, carbon black, and acicular carbon can be used.

There is no particular limitation on the shape of non-aqueous electrolyte lithium-ion secondary batteries and all-solid-state lithium-ion secondary batteries. These batteries may have any shape, such as a cylindrical shape and horn shape.

Preliminary Charge and Discharge

When using the lithium sulfide-iron-carbon composite according to the present invention as a cathode active material for lithium secondary batteries, such as non-aqueous electrolyte lithium-ion secondary batteries and all-solid-state lithium-ion secondary batteries, it is preferable after the preparation of a battery having the desired structure to perform a preliminarily charge and discharge at a capacity lower than the theoretical capacity, and to repeatedly charge and discharge the battery, increasing the capacity step by step. This method causes the extraction/insertion of Li little by little and step by step in the lithium sulfide-iron-carbon composite of the present invention to thereby change the structure (i.e., facilitate stepwise rearrangement of constituent elements), enabling a smooth extraction/insertion of Li; this results in charge and discharge characteristics superior to those of the composite obtained immediately after the mechanical milling.

There is no particular limitation on the preliminary charge and discharge conditions. For example, the initial charge and discharge may be performed at a capacity of about 1/10 to 1/15 of the theoretical capacity, and the subsequent charge and discharge may be performed with an increase in capacity by about 30 to 100 mAh/g, followed by a continual increase of a capacity by about 30 to 100 mAh/g; the charge and discharge may continue to the point at which the capacity value no longer increases. There is no particular limitation on the potential range. For example, charge and discharge can be performed within the potential range from a lower limit voltage of 3.0 to 1.3 V to an upper limit voltage of 2.4 to 2.8 V as with typical sulfide electrode materials. Performing charge and discharge in the narrower potential range, for example, from a lower limit voltage of 1.6 to 2.0 V to an upper limit of 2.4 to 2.8 V enables smoother insertion/extraction of Li, thereby leading to further superior charge and discharge characteristics.

Performing preliminary charge and discharge under the conditions described above can further stabilize the lithium sulfide-iron-carbon composite in which iron atoms are arranged inside the metastably structured lithium sulfide crystal lattice, thereby further enhancing the charge and discharge characteristics, such as capacity and cycle characteristics.

EXAMPLES

The following Examples and Comparative Examples describe the present invention in detail.

Example 1

Commercially available lithium sulfide ($Li_2S$) (mean particle size: about 16 μm) and iron sulfide ($FeS_2$) (mean particle size: about 6 μm) were weighed in an argon gas atmosphere in a glove box (dew point: −80° C.) to give a molar ratio of 3:1, fully mixed in a mortar, and packed into a graphite die having an inner diameter of 15 mm.

Subsequently, the graphite die filled with the starting materials was placed in an electric current sintering apparatus. The current-carrying part, including the graphite die and electrode portions, were housed in a vacuum chamber. The inside atmosphere of the chamber was degassed under vacuum (about 20 Pa), and filled with high-purity argon gas (oxygen concentration: about 0.2 ppm) until the pressure reached the atmospheric pressure.

Thereafter, a pulsed current of about 600 A (pulse width: 2.5 milliseconds, frequency: 28.6 Hz) was applied to the graphite die filled with the starting materials while pressure was applied to the starting materials at about 30 MPa. The vicinity of the graphite die was heated at a heating rate of about 200° C./minute, and the temperature reached 600° C. 3 minutes after the start of pulsed current application. Subsequently, current application and pressure application were immediately ended to allow the resultant to naturally cool down.

After the temperature was decreased to room temperature, a graphite jig was moved into the glove box in an argon gas atmosphere at a dew point of −80° C., and the reaction product of lithium sulfide and iron sulfide was withdrawn from the die, followed by pulverization using a mortar. An acetylene black (AB) powder was mixed with the pulverized product to give a weight ratio of the lithium sulfide-iron sulfide reaction product to AB of 9:1, fully mixed in a mortar, and placed in a zirconia pot in an argon gas atmosphere, followed by mechanical milling for 8 hours using a vibrating-cup milling (model MC-4A) produced by Ito Seisakusho Co., Ltd. The proportion of each element used for the starting materials (atomic %) was as follows: Li 41.7%, Fe 7.0%, S 34.9%, and C 16.5%.

Figure 2:
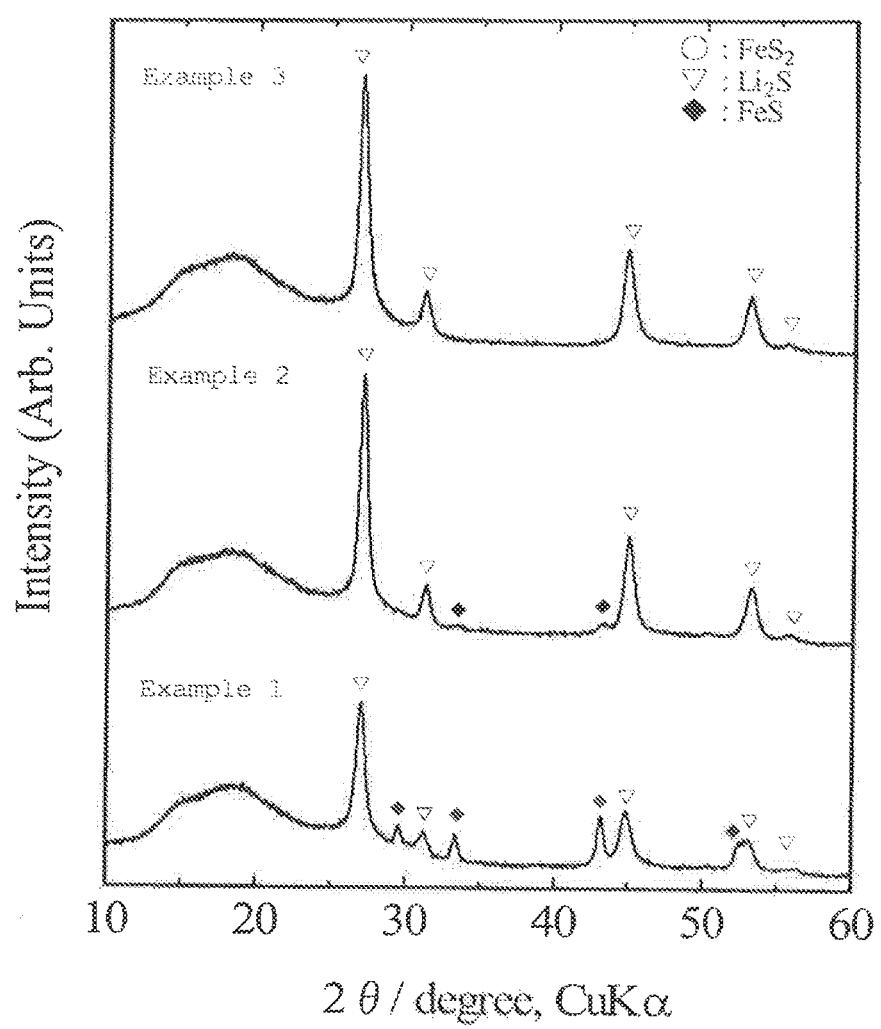
FIG. 2 shows X-ray diffraction patterns of the samples obtained in Examples 1 to 3.

FIG. 2 shows an X-ray diffraction pattern of the obtained sample. As shown in FIG. 2, the peaks assigned to lithium sulfide were observed as the main phase, and, in addition, the peaks of FeS were observed as a trace amount of impurities. The amount (mol %) of FeS estimated in Rietveld analysis was about 9%. The crystallite size estimated from the half width of the diffraction peak based on the (111) plane of lithium sulfide was about 25 nm. The results indicate that the method described above prepared a lithium sulfide-iron-carbon composite containing lithium sulfide as the main phase with a crystallite size of 50 nm or less.

A charge and discharge test was conducted by galvanostatic measurement at a current density of 46.7 mA/g and at a cutoff voltage of 1.0 to 3.0 V by starting charge using the obtained composite powder as a cathode active material for lithium secondary battery, metal lithium as a negative electrode, an aluminum mesh as a collector, and $LiPF_6$ dissolved in an ethylene carbonate/dimethyl carbonate mixture liquid as an electrolyte.

Figure 3:
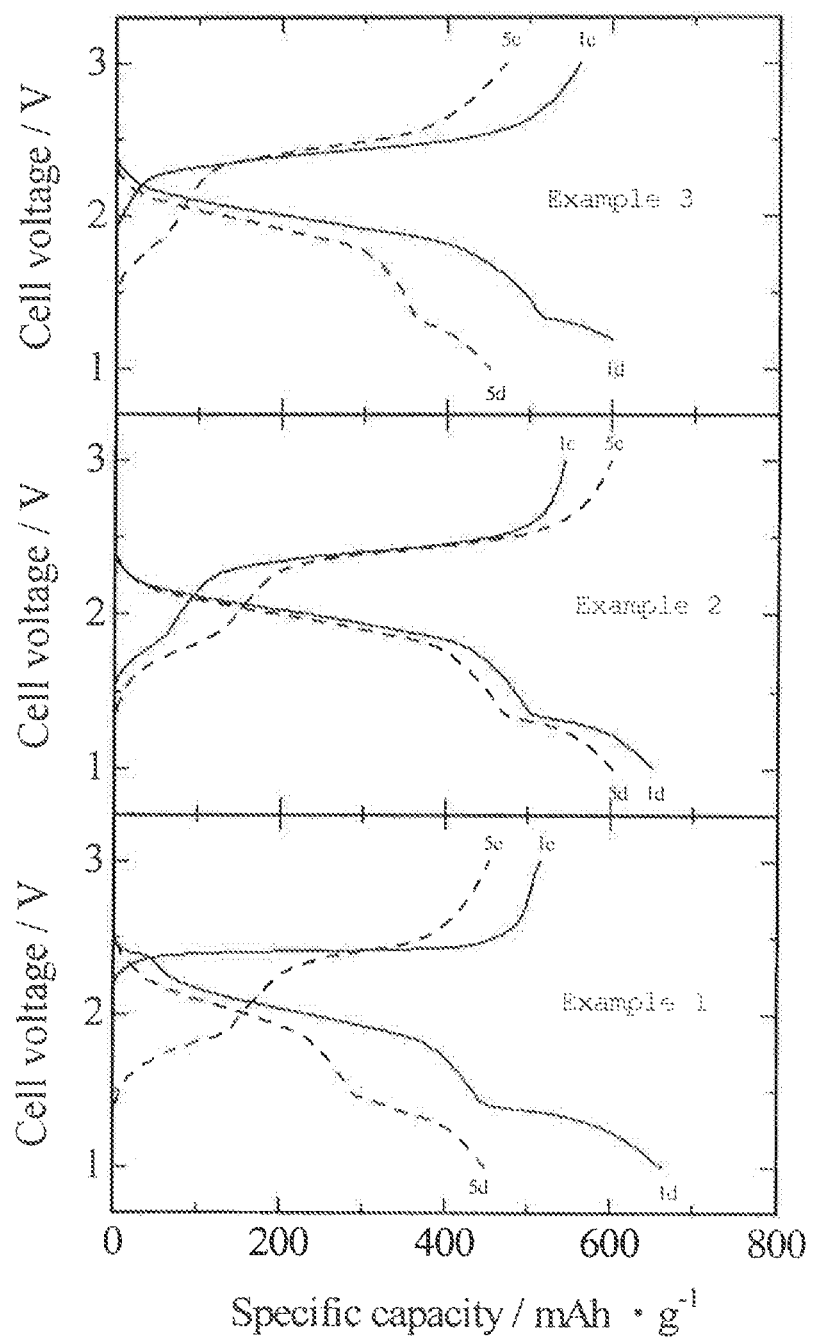
FIG. 3 is a graph showing the charge and discharge characteristics of lithium-ion secondary batteries using the samples obtained in Examples 1 to 3 as a cathode active material.

FIG. 3 shows the charge and discharge characteristics. The initial charge capacity was about 510 mAh/g, and the initial discharge capacity was about 660 mAh/g, which are both significantly higher than those of the sample measured in Comparative Example 1, described below (initial charge capacity about 370 mAh/g, initial discharge capacity about 490 mA/g). The discharge capacity after 5 cycles was about 450 mAh/g (capacity retention: about 68%), which is significantly higher than the value of Comparative Example 1 below (about 300 mAh/g, about 60%).

The results indicate that preparing a lithium sulfide-iron-carbon composite by the method described above can provide a high-capacity electrode material.

Comparative Example 1

Commercially available lithium sulfide ($Li_2S$) (mean particle size: about 16 μm) and iron sulfide ($FeS_2$) (mean particle size: about 6 μm) were mixed to give a molar ratio of 3:1, and subjected to electric current sintering at 600° C. under the same conditions as those of Example 1.

An acetylene black (AB) powder was mixed with the obtained product to give a weight ratio of the lithium sulfide-iron sulfide reaction product to AB of 9:1, thereby preparing a composite. The proportion (atomic %) of each element used for the starting materials was completely the same as that of Example 1; i.e., Li 41.7%, Fe 7.0%, S 34.8%, and C 16.5%.

Figure 4:
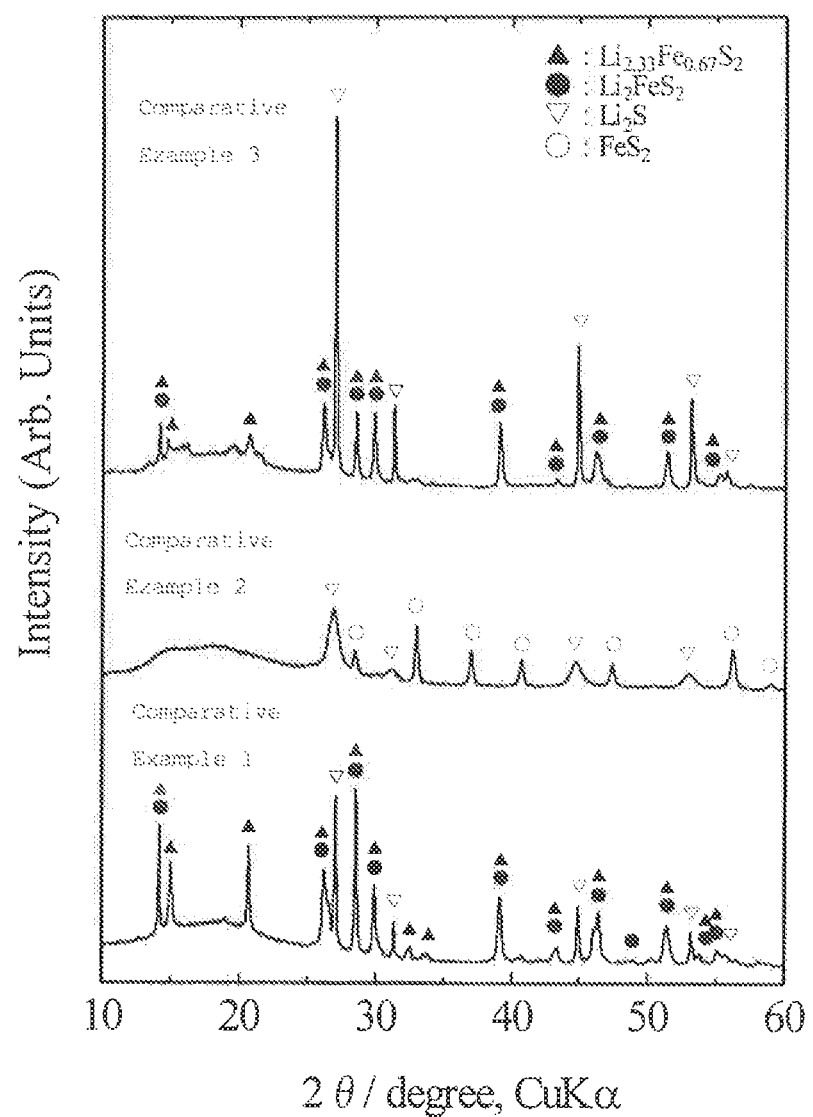
FIG. 4 shows X-ray diffraction patterns of the samples obtained in Comparative Examples 1 to 3.

FIG. 4 shows an X-ray diffraction pattern of the obtained sample. As is clear from FIG. 4, the product largely contained $Li_{2.33}Fe_{0.67}S_2$, $Li_2FeS_2$, and $Li_2S$, with $Li_{2.33}Fe_{0.67}S_2$ as the main phase. The crystallite size estimated from the half width of the diffraction peak based on the (111) plane of the lithium sulfide was about 110 nm.

The results indicate that despite the atomic ratio of lithium, iron, sulfur and carbon being completely the same as that of Example 1, conducting only electric current sintering and not conducting mechanical milling cannot provide a lithium sulfide-iron-carbon composite containing lithium sulfide as the main phase with a crystallite size of 50 nm or less.

Figure 5:
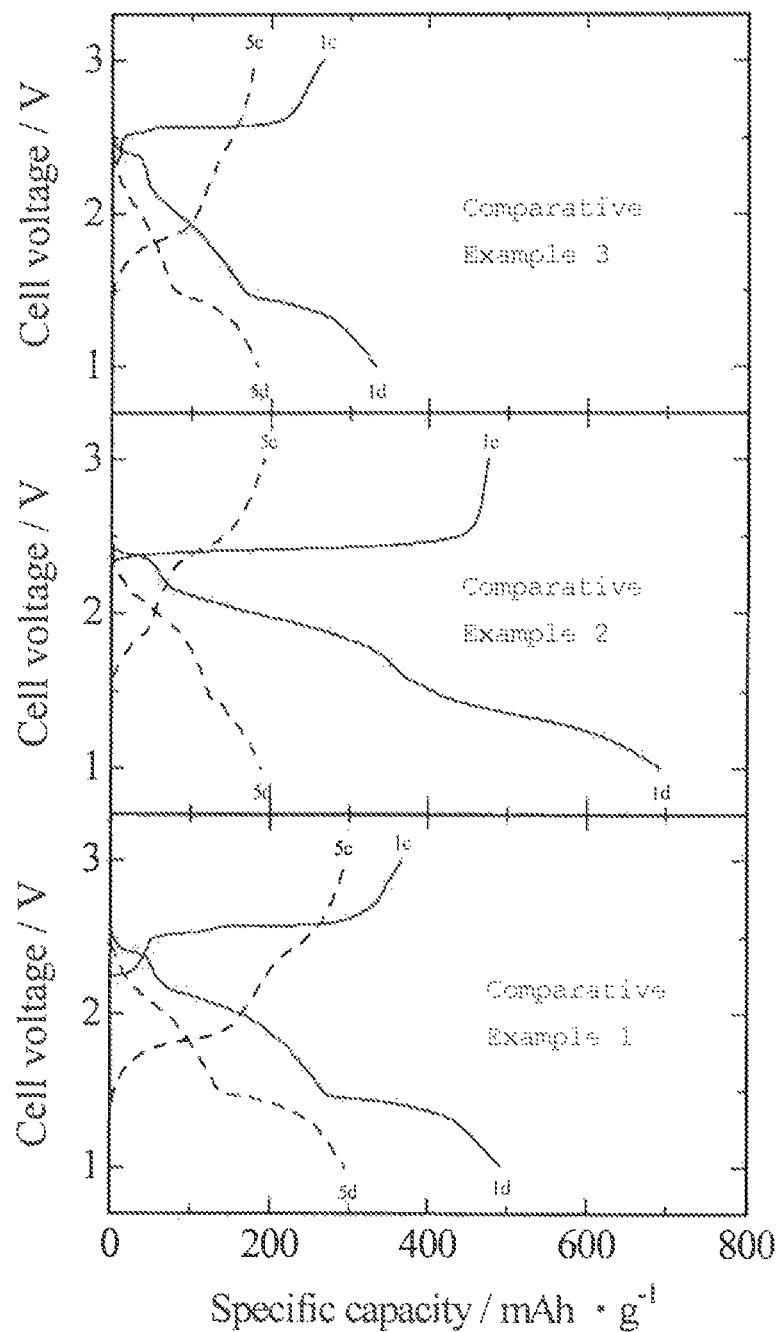
FIG. 5 is a graph showing the charge and discharge characteristics of lithium-ion secondary batteries using the samples obtained in Comparative Examples 1 to 3 as a cathode active material.

A charge and discharge test was conducted in the same manner as in Example 1 except that this composite powder was used as a cathode active material for a lithium secondary battery. FIG. 5 shows the charge and discharge characteristics. The initial charge capacity was about 370 mAh/g, and the initial discharge capacity was about 490 mAh/g, which are both significantly lower than those of the composite obtained in Example 1 (initial charge capacity of about 510 mAh/g, initial discharge capacity of about 660 mAh/g). The discharge capacity after 5 cycles was about 300 mAh/g (capacity retention of about 60%), which is lower than that of Example 1 (about 450 mAh/g, about 68%).

The results indicate that when used as a cathode active material for lithium secondary battery, the product obtained by conducting only electric current sintering and not conducting mechanical milling cannot achieve high capacity values.

Comparative Example 2

Commercially available lithium sulfide ($Li_2S$) (mean particle size: about 16 μm) and iron sulfide ($FeS_2$) (mean particle size: about 6 μm) were weighed to give a molar ratio of 3:1, and an acetylene black (AB) powder was further mixed to give a weight ratio of lithium sulfide+iron sulfide mixture powder to AB of 9:1, followed by mechanical milling for 8 hours under the same conditions as in Example 1, thereby preparing a composite. The proportion (atomic %) of each element used for the starting materials was completely the same as in Example 1; i.e., Li 41.7%, Fe 7.0%, S 34.8%, and C 16.5%.

FIG. 4 shows an X-ray diffraction pattern of the obtained sample. As is clear from FIG. 4, the product largely contained $Li_2S$ and $FeS_2$, and the estimated ratio of $Li_2S$ to $FeS_2$ (moil) was 83:17 in Rietveld analysis, with 10% or more of an impurities phase other than $Li_2S$ being contained. The crystallite size estimated from the half width of the diffraction peak based on the (111) plane of lithium sulfide was about 22 nm.

The results indicate that despite the atomic ratio of lithium, iron, sulfur, and carbon being completely the same as in Example 1, performing only milling and not performing electric current sintering provides only a mixture containing 10% or more of an impurities phase other than lithium sulfide.

A charge and discharge test was conducted in completely the same manner as in Example 1 except that this composite powder was used as a cathode active material for lithium secondary battery. FIG. 5 shows the charge and discharge characteristics: the initial charge capacity was about 470 mAh/g, and the initial discharge capacity was about 690 mAh/g, which are both substantially at the same levels as those of the composite obtained in Example 1 (initial charge capacity of about 510 mAh/g, initial discharge capacity of about 660 mAh/g). However, the discharge capacity after 5 cycles was about 190 mAh/g (capacity retention of about 27%), which is significantly lower than that of Example 1 (about 450 mAh/g, about 68%). The probable reason for this is that because a high-temperature heating treatment in electric current sintering was not performed, the elements were not sufficiently mixed at the atomic level, which increased sulfur atoms (free sulfur) not binding to transition metals, thereby leading to deterioration in cycle characteristics.

The results indicate that performing only mechanical milling and not performing electric current sintering cannot provide a lithium sulfide-iron-carbon composite containing lithium sulfide as the main phase, and that the use of the composite as a cathode active material for lithium secondary battery cannot provide excellent cycle characteristics.

Example 2

Completely the same procedure as in Example 1 was repeated except that the mixture ratio of lithium sulfide ($Li_2S$) to iron sulfide ($FeS_2$) was 4:1 on a molar basis, thereby preparing a lithium sulfide-iron-carbon composite. The proportion (atomic %) of each element used for the starting materials was as follows: Li 44.9%, Fe 5.6%, S 33.7%, and C 15.8%.

FIG. 2 shows an X-ray diffraction pattern of the obtained sample. As shown in FIG. 2, the peaks assigned to lithium sulfide were observed as the main phase, and in addition, the peaks of FeS were observed as a trace amount of impurities. The amount (mol %) of Fes estimated in Rietveld analysis was about 5%. The crystallite size estimated from the half width of the diffraction peak based on the (111) plane of lithium sulfide was about 29 nm.

The results indicate that the method described above prepared a lithium sulfide-iron-carbon composite containing lithium sulfide as the main phase with a crystallite size of 50 nm or less.

A charge and discharge test was conducted by galvanostatic measurement at a current density of 46.4 mA/g and at a cutoff voltage of 1.0 to 3.0 V by starting charge using the obtained composite powder as a cathode active material for lithium secondary battery, metal lithium as a negative electrode, an aluminum mesh as a collector, and $LiPF_6$ dissolved in an ethylene carbonate/dimethyl carbonate mixture liquid as an electrolyte.

Before conducting the charge and discharge test described above, a preliminary charge and discharge was performed at a capacity of 50 mAh/g, and then the capacity was increased by 50 mAh/g to a capacity of 100 mAh/g. Sequentially, the capacity was increased by 50 mAh/g step by step, and the charge and discharge continued until the total capacity reached 600 mAh/g. After this preliminary charge and discharge treatment, the electrodes were withdrawn and X-ray diffraction analysis was conducted. Only broad peaks of Li$_2$S were observed, and the composite was confirmed to contain lithium sulfide as the main phase even after the pretreatment.

FIG. 3 shows the charge and discharge characteristics. The initial charge capacity was about 540 mAh/g, and the initial discharge capacity was about 650 mAh/g, which are both substantially as high as in the sample measured in Example 1 (initial charge capacity of about 510 mAh/g, initial discharge capacity of about 660 mA/g). The discharge capacity after 5 cycles was about 600 mAh/g (capacity retention of about 93%), which is higher than that of Example 1 (about 450 mAh/g, about 68%).

The results indicate that preparing a lithium sulfide-iron-carbon composite by the method described above can provide a high-capacity electrode material. The results also indicate that performing preliminary charge and discharge with a stepwise increase in capacity can enhance the charge and discharge performance.

Example 3

Completely the same procedure as in Example 1 was repeated except that a mixture ratio of lithium sulfide (Li$_2$S) to iron sulfide (FeS$_2$) was 5:1 on a molar basis, thereby preparing a lithium sulfide-iron-carbon composite. The proportion (atomic %) of each element used for the starting materials was as follows: Li 47.1%, Fe 4.7%, S 33.0%, and C 15.2%.

FIG. 2 shows an X-ray diffraction pattern of the obtained sample. As is clear from FIG. 2, only the diffraction peaks of lithium sulfide were observed. The crystallite size estimated from the half width of the diffraction peak based on the (111) plane of lithium sulfide was about 27 nm.

The results indicate that the method described above prepared a lithium sulfide-iron-carbon composite containing lithium sulfide as the main phase with a crystallite size of 50 ram or less.

A charge and discharge test, including the preliminary charge and discharge treatment, was conducted in completely the same manner as in Example 2 except that this composite powder was used as a cathode active material for lithium secondary battery. FIG. 3 shows the charge and discharge characteristics. The initial charge capacity was about 560 mAh/g, and the initial discharge capacity was about 600 mAh/g, which are both substantially as high as in the sample measured in Example 1 (initial charge capacity of about 510 mAh/g, initial discharge capacity of about 660 m A/g). The discharge capacity after 5 cycles was about 450 mAh/g (capacity retention of about 75%), which is substantially the same as in Example 1 (about 450 mAh/g, about 68%).

The results indicate that preparing a lithium sulfide-iron-carbon composite by the method described above can provide a high-capacity electrode material.

Comparative Example 3

Commercially available lithium sulfide (Li$_2$S) (mean particle size of about 16 μm) and iron sulfide (FeS$_2$) (mean particle size of about 6 μm) were mixed to give a molar ratio of 5:1, and subjected to electric current sintering at 600° C. under the same conditions as those of Example 3.

An acetylene black (AB) powder was mixed with the obtained product to give a weight ratio of the lithium sulfide-iron sulfide reaction product to AB of 9:1, thereby preparing a composite. The proportion (atomic %) of each element used for the starting materials was completely the same as in Example 3; i.e., Li 47.1%, Fe 4.7%, S 33.0%, and C 15.2%.

FIG. 4 shows an X-ray diffraction pattern of the obtained sample. As is clear from FIG. 4, the product showed peaks assigned to lithium sulfide as the main phase, and, in addition, the peaks ascribed to Li$_{2.33}$Fe$_{0.67}$S$_2$ and Li$_2$FeS$_2$ were observed. The crystallite size estimated from the halt width of the diffraction peak based on the (111) plane of lithium sulfide was about 120 nm.

The results indicate that despite the atomic ratio of lithium, iron, sulfur, and carbon being the same as in Example 3, performing only electric current sintering and not performing mechanical milling cannot provide a lithium sulfide-iron-carbon composite with a lithium sulfide crystallite size of 50 nm or less.

A charge and discharge test was conducted in completely the same manner as in Example 1 except that this composite powder was used as a cathode active material for lithium secondary battery. FIG. 5 shows the charge and discharge characteristics. The initial charge capacity was about 270 mAh/g, and the initial discharge capacity was about 330 mAh/g, which are significantly lower than in the composite obtained in Example 3 (initial charge capacity of about 560 mAh/g, initial discharge capacity of about 600 mAh/g). The discharge capacity after 5 cycles was about 190 mAh/g (capacity retention of about 55%), which is lower than in Example 1 (about 450 mAh/g, about 68%).

The results indicate that performing only electric current sintering and not performing mechanical milling together cannot provide a lithium sulfide-iron-carbon composite with a crystallite size of 50 nm or less, and that the use of the composite as a cathode active material for lithium secondary battery cannot achieve a high capacity value.

Example 4

Completely the same procedure as in Example 1 was repeated except that the iron-containing compound used as a starting material was replaced by iron sulfide (FeS) (mean particle size: about 8 μm), thereby preparing a lithium sulfide-iron-carbon composite. The proportion (atomic %) of each element used for the starting materials was as follows: Li 45.9%, Fe 7.6%, S 30.6%, and C 16.0%.

Figure 6:
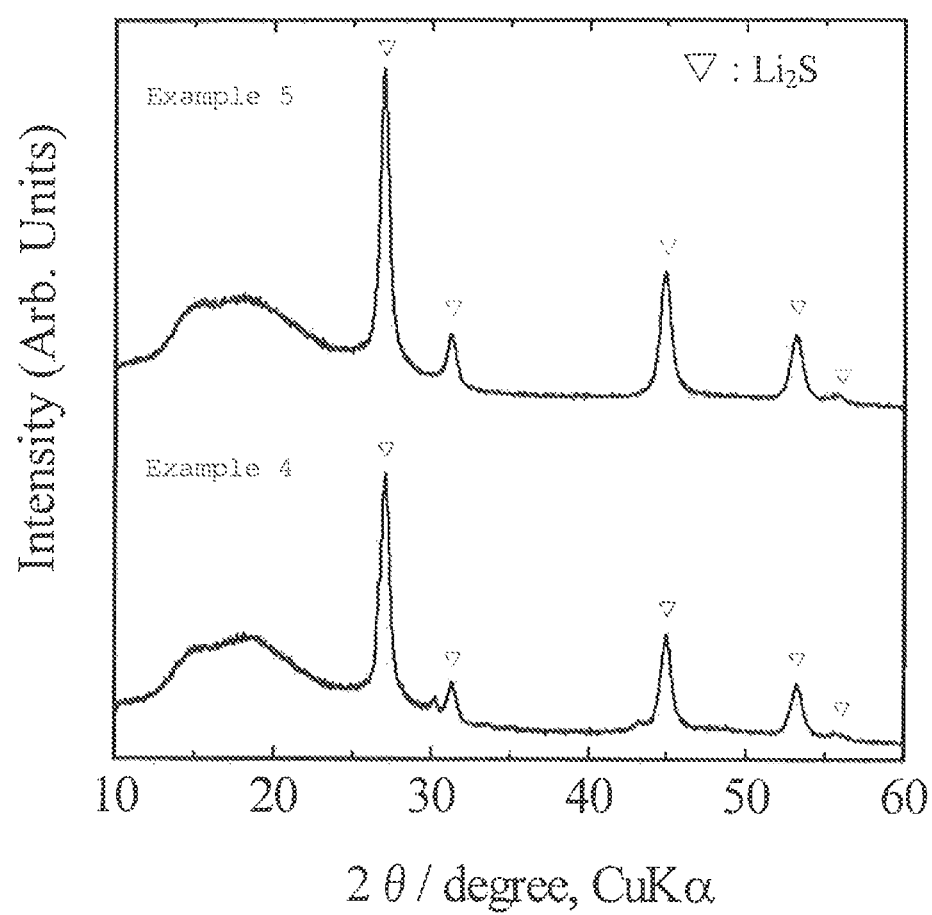
FIG. 6 shows X-ray diffraction patterns of the samples obtained in Examples 4 and 5.

FIG. 6 shows an X-ray diffraction pattern of the obtained sample. As is clear from FIG. 6, although low-intensity peaks of unclear origin were somewhat observed, diffraction peaks of lithium sulfide as the main phase were observed. The amount (mol %) of Li$_2$S estimated in Rietveld analysis was about 99%. The crystallite size estimated from the half width of the diffraction peak based on the (111) plane of lithium sulfide was about 25 nm.

Figure 7:
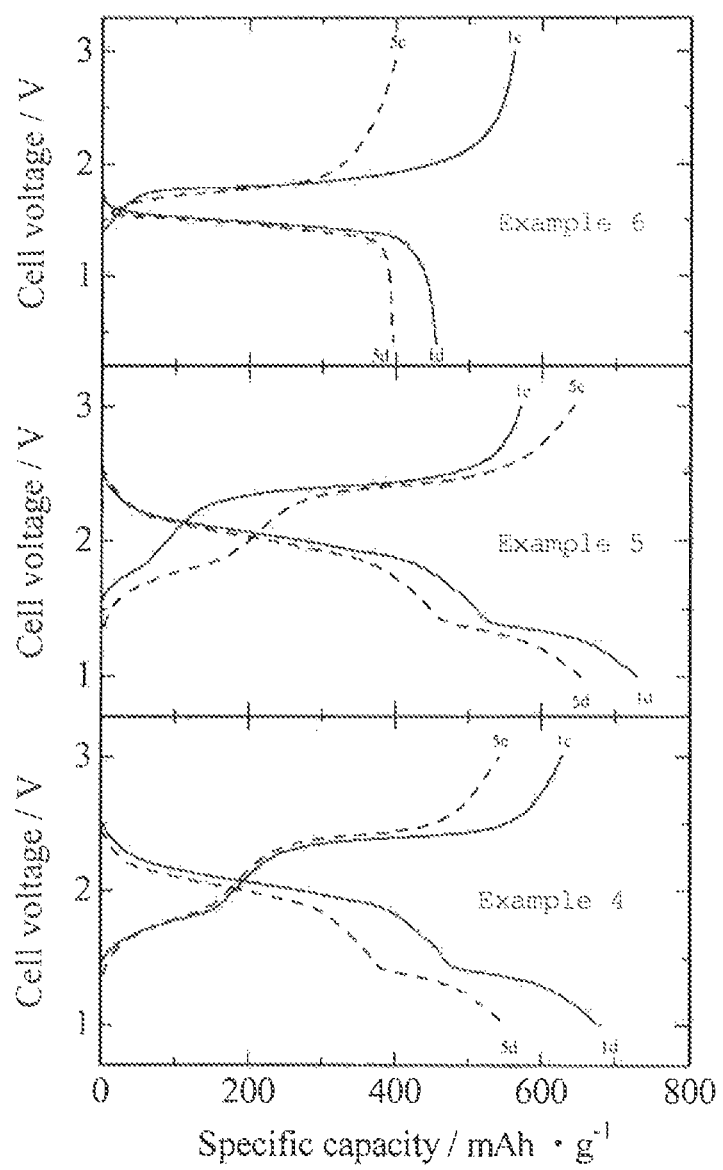
FIG. 7 is a graph showing the charge and discharge characteristics of lithium-ion secondary batteries using the samples obtained in Examples 4 to 6 as a cathode active material.

The results indicate that the method described above prepared a lithium sulfide-iron-carbon composite containing lithium sulfide as the main phase with a crystallite size of 50 nm or less, A charge and discharge test, including the preliminary charge and discharge treatment, was conducted in completely the same manner as in Example 2 except that this composite powder was used as a cathode active material for lithium secondary battery. FIG. 7 shows the charge and discharge characteristics. The initial charge capacity was about 630 mAh/g, and the initial discharge capacity was about 680 mAh/g, which are both substantially as high as in the sample measured in Example 1 (initial charge capacity of about 510 mAh/g, initial discharge capacity of about 660 m A/g). The discharge capacity after 5 cycles was about 550 mAh/g (capacity retention of about 814), which is higher than that of Example 1 (about 450 mAh/g, about 68%).

The results indicate that preparing a lithium sulfide-iron-carbon composite by the method described above can provide a high-capacity electrode material. The results also indicate that performing preliminary charge and discharge with a stepwise increase in capacity can enhance the charge and discharge performance.

Example 5

Completely the same procedure as in Example 4 was repeated except that the mixture ratio of lithium sulfide ($Li_2S$) to iron sulfide (FeS) was 4:1 on a molar basis, thereby preparing a lithium sulfide-iron-carbon composite. The proportion (atomic %) of each element used for the starting materials was as follows: Li 40.4%, Fe 6.1%, S 30.3%, and C 15.2%.

FIG. 6 shows an X-ray diffraction pattern of the obtained sample. As is clear from FIG. 6, only the diffraction peaks of lithium sulfide were observed. The crystallite size estimated from the half width of the diffraction peak based on the (111) plane lithium sulfide was about 28 ram.

The results indicate that the method described above prepared a lithium sulfide-iron-carbon composite containing lithium sulfide as the main phase with a crystallite size of 50 nm or less.

A charge and discharge test, including the preliminary charge and discharge treatment, was conducted in completely the same manner as in Example 2 except that this composite powder was used as a cathode active material for lithium secondary battery. FIG. 7 shows the charge and discharge characteristics. The initial charge capacity was about 570 mAh/g, and the initial discharge capacity was about 730 mAh/g, which are both substantially as high as in the sample measured in Example 4 (initial charge capacity of about 630 mAh/g, initial discharge capacity of about 680 mA/g). The discharge capacity after 5 cycles was about 650 mAh/g (capacity retention of about 90%), which is higher than in Example 4 (about 550 mAh/g, about 81%).

The results indicate that preparing a lithium sulfide-iron-carbon composite by the method described above can provide a high-capacity electrode material. The results also indicate that performing preliminary charge and discharge with a stepwise increase in capacity can enhance the charge and discharge performance.

Example 6

An all-solid-state battery was assembled by using the lithium sulfide-iron-carbon composite obtained in Example 5 as a cathode active material, metal indium as a negative electrode, and $75Li_2S$-$25P_2S_5$ as an electrolyte. Subsequently, a charge and discharge test was conducted.

For a positive electrode, the lithium sulfide-iron-carbon composite described above and $75Li_2S$-$25P_2S_5$ electrolyte were mixed in a weight ratio of 7:3 and used as a positive electrode. The positive electrode/$75Li_2S$-$25P_2S_5$ electrolyte/indium foil was molded by applying pressure to thereby prepare a pellet battery with a diameter of 10 no. This battery was then subjected to a charge and discharge test by galvanostatic measurement at a current density of 11.7 mA/g (74 µA/cm$^2$) and at a cutoff voltage of 0.4-3.0 V by starting charge.

FIG. 7 shows the charge and discharge characteristics. The initial charge capacity was about 560 mAh/g, and the initial discharge capacity was about 450 mAh/g. The discharge capacity after 5 cycles was about 390 mAh/g (capacity retention of about 87%), demonstrating a relatively excellent reversible cycle.

Example 7

Figure 8:
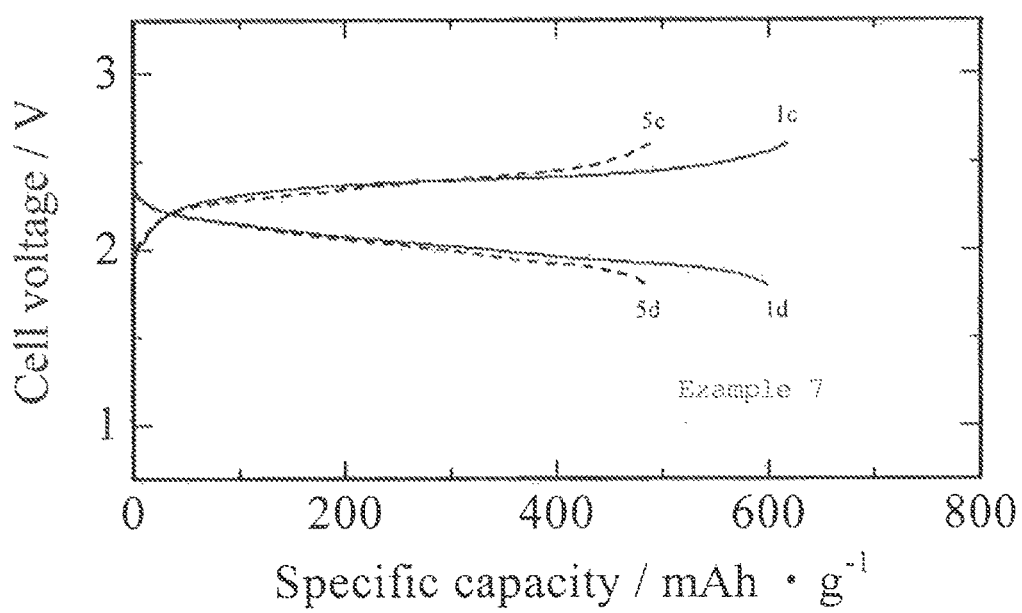
FIG. 8 is a graph showing the charge and discharge characteristics measured in Example 7.

A charge and discharge test, including the preliminary charge and discharge treatment, was conducted in completely the same manner as in Example 3 except that the lithium sulfide-iron-carbon composite obtained in Example 3 was used as a cathode active material, and that the potential range was from the lower limit voltage of 1.8 V to the upper limit voltage of 2.6 V. FIG. 8 shows the charge and discharge characteristics. The initial charge capacity was about 620 mAh/g, and the initial discharge capacity was about 600 mAh/g, which are both substantially as high as in the sample measured in Example 3 (initial charge capacity of about 560 mAh/g, initial discharge capacity of about 600 mA/g). The discharge capacity after 5 cycles was about 490 mAh/g (capacity retention: about 81%), which is higher than that of Example 3 (about 450 mAh/g, about 75%).

The results indicate that performing preliminary charge and discharge with a stepwise increase in capacity in a narrowed potential range can enhance the charge and discharge performance.

DESCRIPTION OF THE REFERENCE NUMERALS

1 Electric current sintering apparatus
2 Sample
3 Die (electrically conductive container)
4, 5 Punches for applying an electric current
6, 7 Punch electrode
8 Water-cooled vacuum chamber
9 Cooling channel
10, 16 Water cooling mechanism
11 Power source for sintering
12 Control unit
13 Pressurizing mechanism
14 Position monitoring mechanism
15 Atmosphere control mechanism
17 Temperature measurement device

We claim:

1. A lithium sulfide-iron-carbon composite comprising, as constituent elements, lithium, iron, sulfur, and carbon, wherein lithium sulfide ($Li_2S$) is present as the main phase, and wherein the crystallite size calculated from a half width of a diffraction peak based on the (111) plane of $Li_2S$ as determined by X-ray powder diffraction is 50 nm or less.

2. The lithium sulfide-iron-carbon composite according to claim 1, wherein
the Li content is 40 to 60 atomic %,
the Fe content is 2 to 10 atomic %,
the S content is 20 to 40 atomic %,
the C content is 10 to 20 atomic %, and
the lithium sulfide phase is present in an amount of 90 mol % or more.

3. A method for producing the lithium sulfide-iron-carbon composite according to claim 1, the method comprising
filling an electrically conductive die with a mixture comprising a lithium-containing compound, an iron-containing compound, and a sulfur-containing compound,
applying a pulsed direct current to the mixture in a non-oxidizing atmosphere while applying pressure to the mixture to thereby subject the mixture to a heating reaction to form a product and, subjecting the obtained product together with a carbon-containing compound to mechanical milling.

4. A cathode active material for a lithium-ion secondary battery, the material comprising the lithium sulfide-iron-carbon composite according to claim 1.

5. A lithium-ion secondary battery comprising the cathode active material according to claim 4.

6. An all-solid-state lithium-ion secondary battery comprising the cathode active material according to claim 4 and a lithium-ion conductive solid electrolyte.

7. A pretreatment method for a lithium-ion secondary battery, the method comprising
   forming a lithium-ion secondary battery comprising the lithium sulfide-iron-carbon composite according to claim 1 as a cathode active material,
   charging and discharging the battery at a capacity lower than the theoretical capacity of the cathode active material, and
   repeatedly charging and discharging the battery with a stepwise increase in capacity.

8. The pretreatment method for a lithium-ion secondary battery according to claim 7,
   wherein the initial charge and discharge is performed at $1/10$ to $1/15$ of the theoretical capacity of the cathode active material, and
   wherein the charge and discharge is performed with a stepwise increase in capacity by 30 to 100 mAh/g.

9. The pretreatment method for a lithium-ion secondary battery according to claim 7, wherein the charge and discharge are performed at a potential range from the lower limit voltage of 1.0 to 1.3 V to the upper limit voltage of 2.8 to 3.0 V.

10. A cathode active material for a lithium-ion secondary battery, the material comprising the lithium sulfide-iron-carbon composite according to claim 2.

11. A lithium-ion secondary battery comprising the cathode active material according to claim 10.

12. An all-solid-state lithium-ion secondary battery comprising the cathode active material according to claim 10 and a lithium-ion conductive solid electrolyte.

13. A pretreatment method for a lithium-ion secondary battery, the method comprising
   forming a lithium-ion secondary battery comprising the lithium sulfide-iron-carbon composite according to claim 2 as a cathode active material,
   charging and discharging the battery at a capacity lower than the theoretical capacity of the cathode active material, and
   repeatedly charging and discharging the battery with a stepwise increase in capacity.

14. The pretreatment method for a lithium-ion secondary battery according to claim 13,
   wherein the initial charge and discharge is performed at $1/10$ to $1/15$ of the theoretical capacity of the cathode active material, and
   wherein the charge and discharge is performed with a stepwise increase in capacity by 30 to 100 mAh/g.

15. The pretreatment method for a lithium-ion secondary battery according to claim 8, wherein the charge and discharge are performed at a potential range from the lower limit voltage of 1.0 to 1.3 V to the upper limit voltage of 2.8 to 3.0 V.

16. The pretreatment method for a lithium-ion secondary battery according to claim 13, wherein the charge and discharge are performed at a potential range from the lower limit voltage of 1.0 to 1.3 V to the upper limit voltage of 2.8 to 3.0 V.

17. The pretreatment method for a lithium-ion secondary battery according to claim 14, wherein the charge and discharge are performed at a potential range from the lower limit voltage of 1.0 to 1.3 V to the upper limit voltage of 2.8 to 3.0 V.

* * * * *